United States Patent [19]

Kafka et al.

[11] Patent Number: 5,212,698
[45] Date of Patent: May 18, 1993

[54] DISPERSION COMPENSATION FOR ULTRASHORT PULSE GENERATION IN TUNEABLE LASERS

[75] Inventors: James D. Kafka, Mountain View; Michael L. Watts, Union City; Shawn D. Streeby, Campbell, all of Calif.

[73] Assignee: Spectra-Physics Lasers, Incorporated, Mountain View, Calif.

[21] Appl. No.: 787,317

[22] Filed: Oct. 30, 1991

Related U.S. Application Data

[63] Continuation-in-part of Ser. No. 697,692, May 9, 1991, which is a continuation of Ser. No. 518,535, May 2, 1990, abandoned.

[51] Int. Cl.$^5$ .............................................. H01S 3/090
[52] U.S. Cl. .................................... 372/18; 372/99; 372/20; 372/100; 372/105; 372/33; 372/108; 372/25
[58] Field of Search ................ 372/18, 20, 100, 105, 372/33, 108, 25, 99

[56] References Cited

U.S. PATENT DOCUMENTS

| | | | |
|---|---|---|---|
| 3,675,154 | 7/1972 | Duguay et al. | 372/102 |
| 3,679,313 | 7/1972 | Rosenberg | 372/101 |
| 3,696,310 | 10/1972 | Paoli et al. | 372/102 |
| 3,720,884 | 3/1973 | Kelley et al. | 372/25 |
| 5,017,806 | 5/1991 | Edelstein et al. | 372/94 |
| 5,020,073 | 5/1991 | Alfrey et al. | 372/105 |

*Primary Examiner*—Léon Scott, Jr.
*Attorney, Agent, or Firm*—Kenneth D'Alessandro

[57] ABSTRACT

A mode locked pulsed laser incorporates an intracavity element to compensate for the dispersion caused by other intracavity elements. This element reduces the tendency of the pulse to broaden in the cavity due to group velocity dispersion and results in very short pulses. In the laser of the present invention, mode locking is initiated by detecting the beat frequency between adjacent longitudinal modes using a high speed photodiode. This signal is amplified and then the frequency is divided by two. The signal is passed through an electronically adjustable phase shifter and then to a power amplifier. This signal is applied to the acousto-optic modelocker. If the cavity length drifts the beat frequency between the longitudinal modes changes. The rf signal applied to the modulator changes in exactly the right manner to track the drift in cavity length. Thus the modelocker is automatically synched to the round trip of the laser cavity.

12 Claims, 8 Drawing Sheets

DISPERSION COMPENSATION FOR ULTRASHORT PULSE GENERATION IN TUNEABLE LASERS

RELATED APPLICATIONS

This application is a continuation-in-part of co-pending application Ser. No. 07/697,692, filed May 9, 1991, which is a continuation of application Ser. No. 07/518,535, filed May 20, 1990, now abandoned.

BACKGROUND OF THE INVENTION

1. Field of the Invention

The present invention relates to laser technology. More particularly, the present invention relates to mode-locked lasers.

2. The Prior Art

Pulsed lasers for generation of short laser pulses are useful in a variety of applications. Active modelocking has been employed in lasers to achieve pulses having durations of around typically 30 to 50 psec in these systems. Shorter pulses have been observed but pulse trains have amplitude noise and/or phase noise. Other techniques have been developed to generate short pulses, including additive pulse modelocking and use of saturable absorbers. These techniques are complicated and are low average power systems.

An object of the present invention is to obtain ultrashort pulses at high average power from a laser.

BRIEF DESCRIPTION OF THE INVENTION

In a first aspect of the present invention, an actively mode locked pulsed laser incorporates an intracavity Gires Tournois interferometer to compensate for the group velocity dispersion caused by other intracavity elements. This interferometer reduces the tendency of the pulse to broaden in the cavity due to group velocity dispersion and results in very short pulses.

In a presently preferred embodiment, the laser employs a folded, astigmatically compensated design with Ti:Sapphire as the gain medium, pumped by an argon ion laser. Modelocking is initiated in the laser using a standard acousto-optic modelocker. The laser is tuned using an intracavity birefringent filter. These elements restrict the lasing bandwidth and allow tuning from 660 nm to 1100 nm. A group of four prisms is placed in the arm of the cavity containing the mode locker to compensate for the group velocity dispersion caused by intracavity elements, including the birefringent filter.

It has been discovered by the inventors that a variable spaced GTI may be usefully employed in the cavity of a tuneable laser. As the laser wavelength is tuned, the spacing of the GTI elements is adjusted by use of the piezo-electric crystal to compensate for the dispersion caused by the intracavity elements without affecting the alignment of the laser.

The mirrors in the GTI are mounted on a piezoelectric crystal which allows the spacing between the mirrors to be adjusted with an applied voltage. This fine adjustment of the spacing allows the GTI to be tuned to the proper wavelength to cancel the dispersion of the birefringent filter.

Dispersion compensation for subpicosecond pulses may also be accomplished using prism pairs. Systems incorporating one and two prism pairs are disclosed herein. These systems may also employ slits or birefringent filters as tuning elements. The combination of prisms and GTI etalons is also advantageous for certain applications.

In a second aspect of the present invention, the mode locked laser of the present invention is mode-locked by detecting the beat frequency between adjacent longitudinal modes using a high speed photodiode. This signal is amplified and then the frequency is divided by two. The signal is passed through an electronically adjustable phase shifter and then to a power amplifier. This signal is applied to the acousto-optic modelocker. If the cavity length drifts the beat frequency between the longitudinal modes changes. The signal applied to the modulator changes in exactly the right manner to track the drift in cavity length. Thus the modelocker is automatically synchronized to the round trip of the laser cavity.

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

In a first aspect of the present invention, an actively mode locked tuneable pulsed laser incorporates an intracavity Gires Tournois interferometer to compensate for the dispersion caused by other intracavity elements. This etalon reduces the tendency of the pulse to broaden in the cavity due to group velocity dispersion and results in very short pulses.

Figure 1:
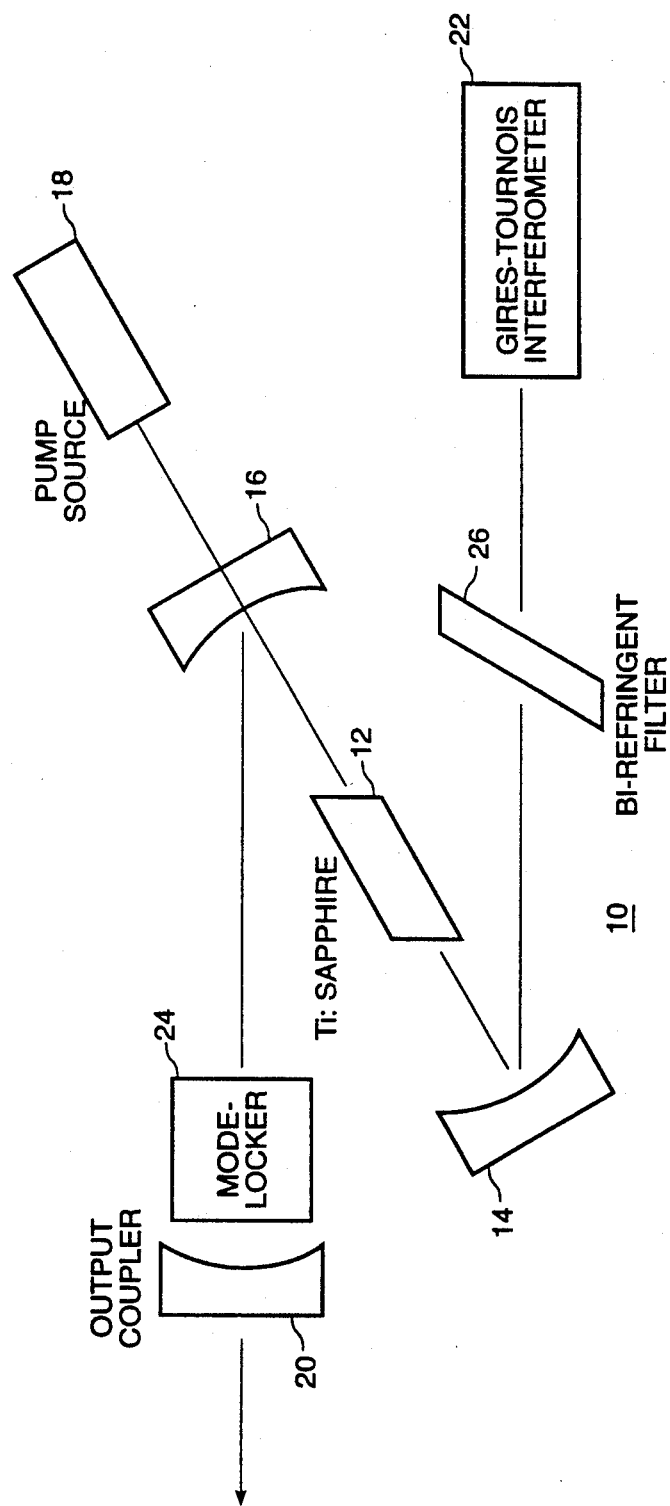
FIG. 1 is a diagram showing the elements of a first embodiment of a laser according to the present invention and their structural relationship to one another.

Referring first to FIG. 1, a presently preferred embodiment, a laser system 10 according to the present invention includes a Ti:Sapphire gain medium 12, which may be the same Ti:Sapphire gain medium as that used in the Model 3900 laser available from Spectra Physics, Inc., of Mountainview, California. In the embodiment of FIG. 1, a folded, astigmatically compensated cavity design is employed using curved mirrors 14 and 16, such as curved mirrors part no. G0079-012, available from Spectra Physics Optics Corporation of Mountainview, California.

The gain medium 12 may be pumped by a suitable pump source, such as an all-lines argon ion laser 18, is focussed (not shown) and coupled into the cavity through curved mirror 16 as is known in the art. A first end of the cavity of laser 12 is defined by output coupler 20, which may be fabricated on a substrate part no. G0058 made by Spectra Physics Optics Corp., coated to a reflectivity of about 85%. The second end of the laser cavity is defined by GTI 22. In a presently preferred embodiment, GTI 22 may be a model 410, available from Spectra Physics Optics.

Modelocking of the laser 10 of the present invention is initiated using a standard acousto-optic modelocker 24. In a presently preferred embodiment, mode locker 24 may be one similar to the mode locker used in the Spectra Physics Model 3800 solid state laser, available from Newport Electro Optic Systems of Melbourne, Florida, but having an A coating suitable for the desired wavelength. It has been discovered that once modelocking has been initiated by the active mode locker, the drive signal can be turned off and the laser will remain mode locked for several hours. Modelocking will not occur, however, if the laser is first turned on without the mode locker being connected. Thus, the acousto-optic modulator an active means for initiating modelocking.

The laser 10 may be tuned using an intracavity birefringent filter 26. Single or multi plate birefringent filters are available from Spectra Physics, part no. 0434-8931, or from Virgo Optics of Port Richey, Florida. As will be appreciated by those of ordinary skill in the art, such a filter restricts the lasing bandwidth and allows tuning from 660 nm to 1100 nm.

Although the birefringent filter 26 is necessary for tuning, it also broadens the pulses in the laser by introducing group velocity dispersion. In addition, the Ti Sapphire rod, the mode locker, and the glass in the GTI also introduce group velocity dispersion. Different colors travel at different velocities through these elements. The pulse, which is composed of a spectrum of colors, is broadened by this group velocity dispersion after passage through these elements.

It has been heretofore assumed that the birefringent filter tuning element limited the bandwidth of the laser which in turn prevented the pulses from becoming short. However, broad band operation is possible using a one plate birefringent filter, but does not yield short pulses. The present inventors have discovered that the reason that tunable lasers produce broad pulses is because of the dispersion of the intracavity elements including the tuning element. Thus, adding the GTI (Gires-Tournois Interferometer) can compensate for dispersion introduced by these elements and can lead to a dramatic pulse shortening.

According to a presently preferred embodiment of the invention, the GTI is placed in the cavity to compensate for the group velocity dispersion caused by intracavity elements. This interferometer has the advantage that it is a very low loss element that does not significantly reduce the output power level of the laser. Thus high average power outputs are possible.

One Other advantage of this technique is that nearly transform-limited pulses are generated. That is, the bandwidth of the pulses is the minimum necessary to produce the pulse width observed and no additional frequencies are generated. As used herein, "nearly" transform-limited pulses are within a factor of 1.5 of this minimum bandwidth. This is desirable, both for use in spectroscopic experiments and for pulse compression which can produce still shorter pulse widths.

Figure 2A:
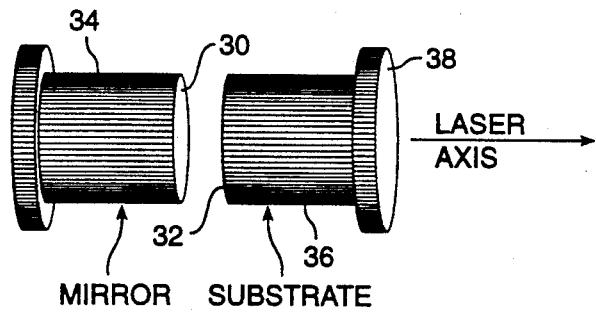
FIGS 2a–2c are more detailed diagrams of a presently preferred construction of a GTI etalon used in the present invention.
Figure 2B:
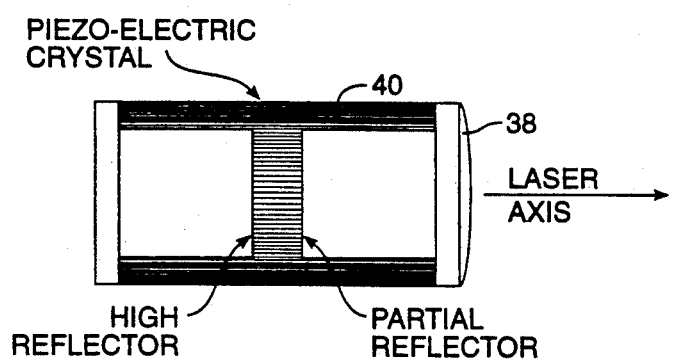
Figure 2C:
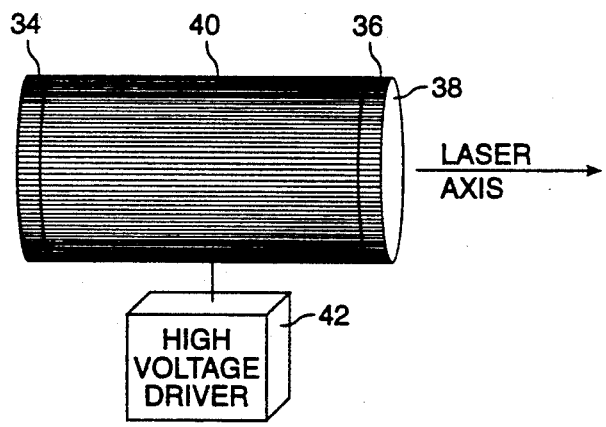

Referring now to FIG. 2a, a GTI 22 suitable for use in the present invention is seen to include a flat high-reflective surface 30 and a partially-reflective surface 32 aligned in parallel relationship to one another, to form an etalon. In the embodiment of FIG. 2a, surfaces 30 and 32 are disposed on mirror substrates 34 and 36, respectively. The other end of mirror substrate 36 is provided with an anti-reflective coating 38. As shown diagrammatically in cross section in FIG. 2b, this assembly is mounted on a piezoelectric crystal 40 which allows the spacing between the mirrors to be adjusted with an applied voltage supplied by high voltage driver 42. High voltage driver 42 may be a Model 476 interferometer driver available from Spectra Physics Inc., of Mountainview Ca. This fine adjustment of the spacing allows the GTI to be tuned to the proper wavelength to cancel the dispersion of the intracavity elements. An air-spaced GTI was used to pulse compress a HeNe laser which operated at a fixed wavelength. The spacing was set to give the shortest pulses and then never adjusted. M. A. Duguay and J. W. Hansen, Compression of Pulses From a Mode Locked He-Ne Laser, Appl. Phy. Let. Vol. 14, No. 1, p. 14 1969. Solid GTI's have previously been used in a CPM laser to compensate for dispersion. Since these lasers are not tuneable, the GTI is employed at an angle to optimize the dispersion, the laser is realigned and the GTI is never adjusted. J. Heppner and J. Kuhl, Intracavity Chirp Compensation in a Colliding Pulse Mode Locked Laser Using Thin Film Interferometers, Appl. Phy. Let Vol. 47, No. 5, p. 453 1985. In a tuneable laser, the GTI must be readjusted for wavelength changes as small as one nanometer.

The use of a variable space GTI in the cavity of a tuneable laser according to the present invention allows the dispersion to be optimized at each wavelength without altering the angle of the GTI and thus misaligning the laser. The improvement of the present invention is useful in any tuneable modelocked laser regardless of the modelocking means used.

The spacing of the surfaces 30 and 32 and the interferometer, and the reflectivity of surface 32 are chosen to provide the appropriate group velocity dispersion compensation for the intracavity elements used in the tunable laser. It has been found that an uncoated mirror supplying a reflection of 4% and a spacing of 80 microns compensates a standard single or double plate birefringent filter, a 2 cm Ti:sapphire rod, 2 cm of glass in the mode locker and 1 cm of glass in the GTI. This combination of elements produces pulses of 1-2 picoseconds. If the spacing is increased, the negative dispersion will increase and the pulse width will also increase. These pulses remain nearly transform limited. For a reflection of 4% and a spacing of 1,500 microns, pulses of about 80 picoseconds are observed. Those of ordinary skill in the art will immediately recognize that such GTI thicknesses, i.e., in the range of from about 200 to 1,500 microns will substantially overcompensate for group velocity dispersion.

Figure 2D:
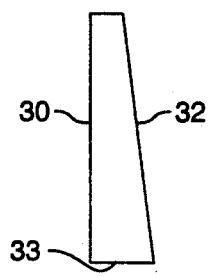
FIG. 2d is a diagram of an alternative embodiment of a GTI etalon according to the present invention.

Referring to FIG. 2d, an alternate embodiment of a GTI etalon useful in the present invention comprises a substrate 33 having opposed surfaces 30 and 32. Surface 30 is a high reflective surface and surface 32 is a partially reflective surface. In a typical embodiment, substrate 33 may be fabricated from fused silica, and may have a diameter of about 2.5 cm. A typical thickness for the substrate is about 50–100 microns, tapered by about 2 microns over its diameter such that faces 30 and 32 are not exactly parallel. Within a single beam diameter, however, this structure appears to have parallel faces and is tuneable by moving it along an axis normal to the beam path. Of course, a wedged air gap of similar dimensions may also be used.

If the beam is reflected from the GTI several times during one cavity round trip, the thickness of the spacer layer can be decreased. For thicknesses of less than 10 microns, the spacer can also be a dielectric coating applied directly to the high reflector when the mirror is fabricated. This dielectric spacer may also be wedged by known techniques such that translating the substrate will vary the thickness of the portion of the spacer traversed by the laser beam. To tune the laser the birefringent filter is first adjusted as known by those of ordinary skill in the art to tune the laser to the appropriate color. A voltage is applied to the piezoelectric crystal in the GTI to adjust its spacing or the wedged GTI is translated to provide the shortest pulses.

Those of ordinary skill in the art will recognize that other means of dispersion compensation or tuning are possible in tuneable lasers that have a small insertion loss and which thus can produce high average power. In particular, a pair of prisms can be used for dispersion compensation. This prism pair comprises two Brewster prisms placed in the cavity at Brewster's angle and arranged so that the second prism cancels the spread of the spectral components from the first prism.

Figure 3A:
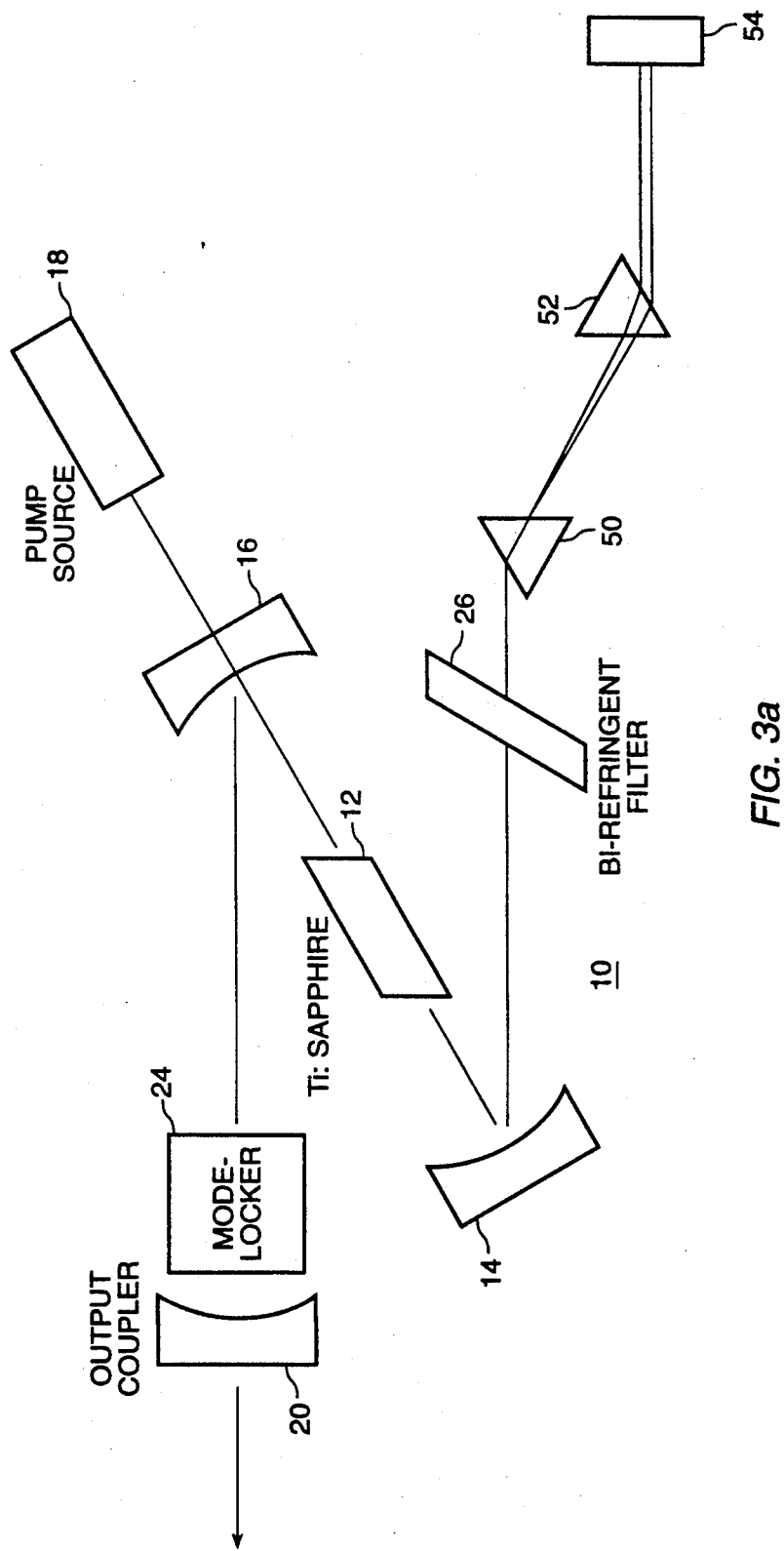
FIG. 3a is a diagram showing the elements of a first alternate embodiment of a laser according to the present invention and their structural relationship to one another.

If a prism pair is used to compensate the dispersion, several different tuning elements are possible. A birefringent filter may still be used. Such an embodiment is shown in FIG. 3a, where a prism pair including first and second prisms 50 and 52 are placed in the beam path along with birefringent filter 26. A flat end mirror 54 defines the end of the laser cavity. The spectral components of the laser beam are shown dispersed in the plane of the figure.

Figure 3B:
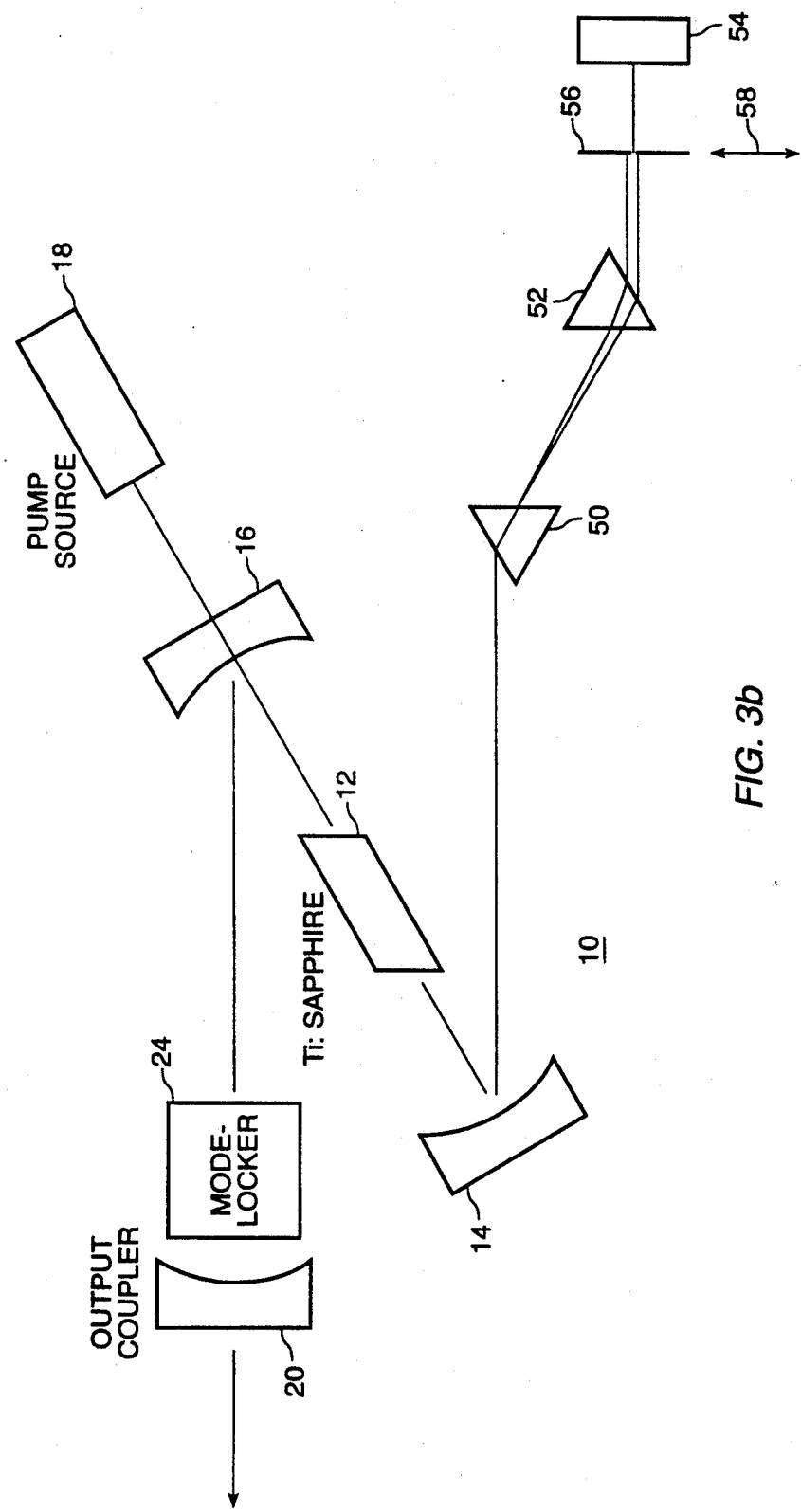
FIG. 3b is a diagram showing the elements of a second alternate embodiment of a laser according to the present invention and their structural relationship to one another.

In an alternate embodiment, shown in FIG. 3b, a slit 56 is placed between the second prism 52 and a flat end mirror 54 to replace the birefringent filter. In this embodiment, the laser may be tuned by translating the slit 56 along an axis perpendicular to the beam path and in the plane of the figure as indicated by the arrow at reference numeral 58.

Figure 3C:
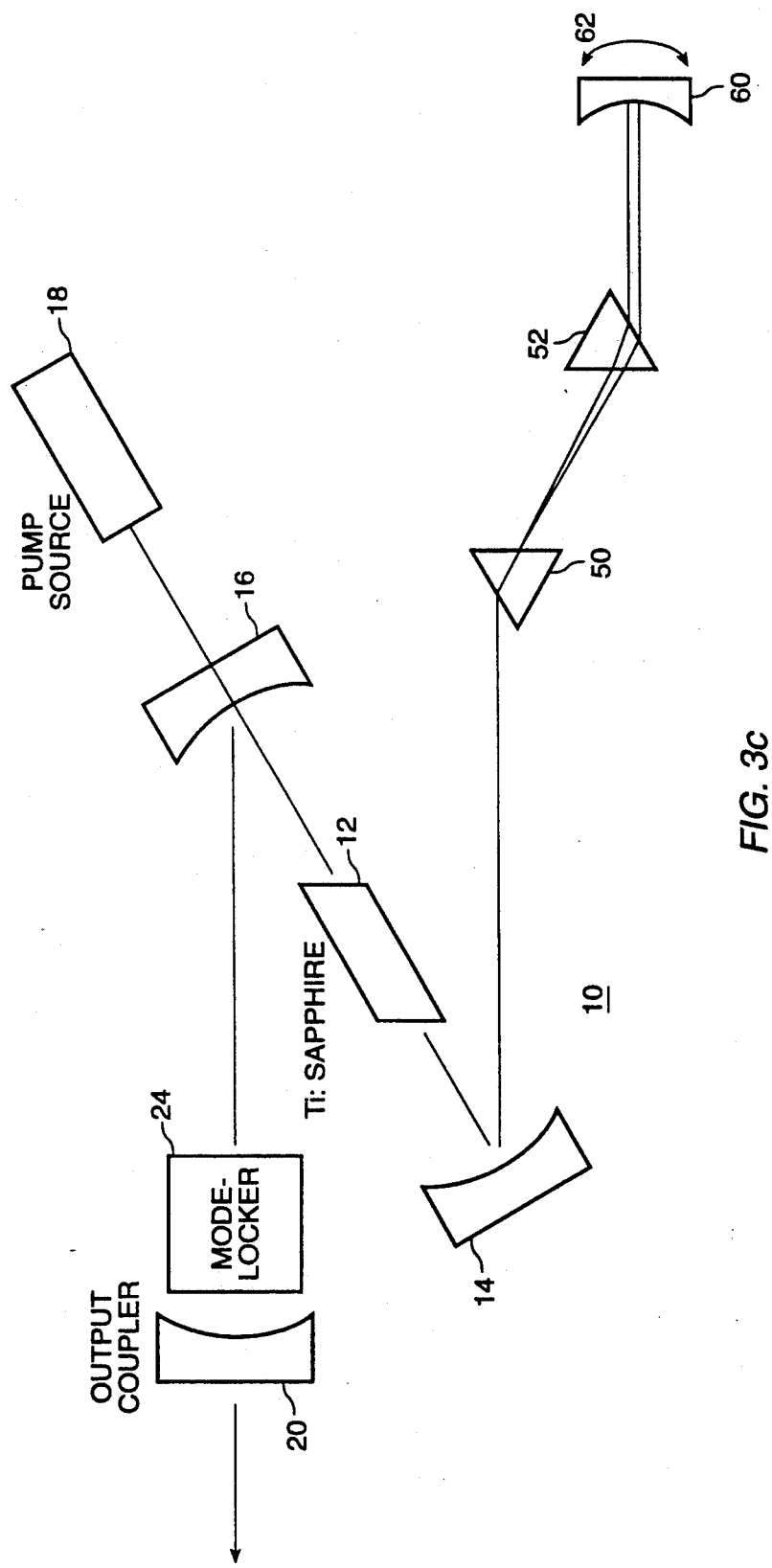
FIG. 3c is a diagram showing the elements of a third alternate embodiment of a laser according to the present invention and their structural relationship to one another.

In a third embodiment, shown in FIG. 3c, the combination of the slit 56 and flat end mirror 54 may be replaced by a curved end mirror 60. In this embodiment, the laser may be tuned by tilting the curved end mirror 60 about an axis perpendicular to the beam and perpendicular to the plane of the figure as indicated by the arrow at reference numeral 62.

Previously, prisms have been used in a laser cavity to compensate for dispersion. Configurations of two prisms have been used in linear laser cavities, but cause a spectral spread in the beam. This requires that a flat end-cavity mirror be used if the beam is to be easily tuneable. This mirror has been the high reflector and not the output coupler to avoid a spectral spread of the output beam, which can be deleterious in certain applications. Four prisms have been employed in ring laser cavities since the spectral spread from two prisms would be additive each time around the ring. Four prisms have previously been employed in linear cavities, but only in dye lasers where the length of the gain media is very short, typically less than 1 mm. In these systems, the prisms have not been located next to the output coupler. In general, ring cavities are more complicated than linear cavities, and linear cavities are generally chosen. This is true for Ti:Sapphire, however, the typical rod thickness of 2 cm causes greater intercavity dispersion and has more stringent mode matching requirements than in previous ultrafast laser systems. To compensate for the dispersion caused by this extra material, more dispersive prisms, such as SF-10 glass brewster prisms, can be used, but the distance between the prisms must still be increased, to as much as 50 cm. This is because the dispersion generated by the prism pair increases linearly as the distance between the prisms increases.

The combination of a flat high-reflector mirror with a distance of at least 50 cm causes spot-size limitations in the rod region. As this arm of the laser cavity becomes larger, the spot size decreases to less than 50 microns. It then becomes difficult to match the pump beam volume to this smaller intracavity beam. This results in either decreased efficiency, thermal distortion, or both. This mode matching problem is much more significant in Ti:Sapphire than in a dye laser where the gain media is much thinner, and thus matching the pump mode is much easier.

Figure 4A:
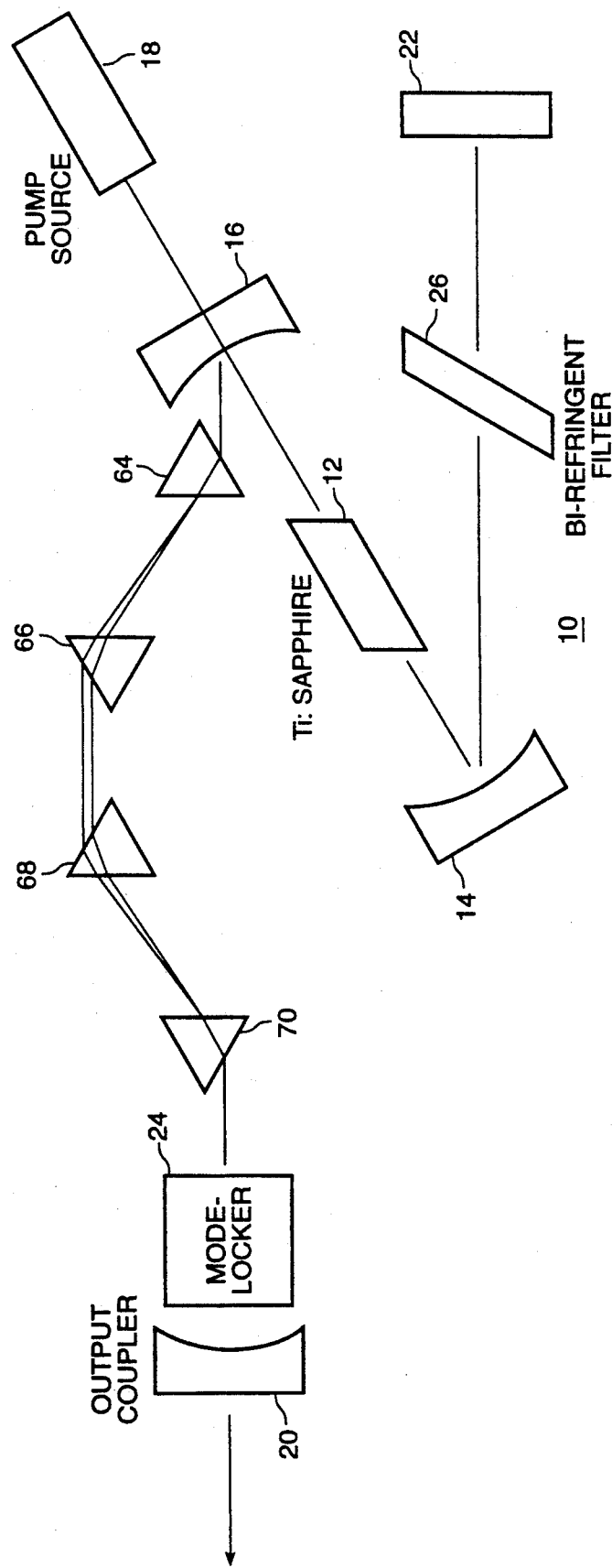
FIG. 4a is a diagram showing the arrangement of the elements in a linear laser cavity according to a presently preferred embodiment of the present invention.
Figure 4B:
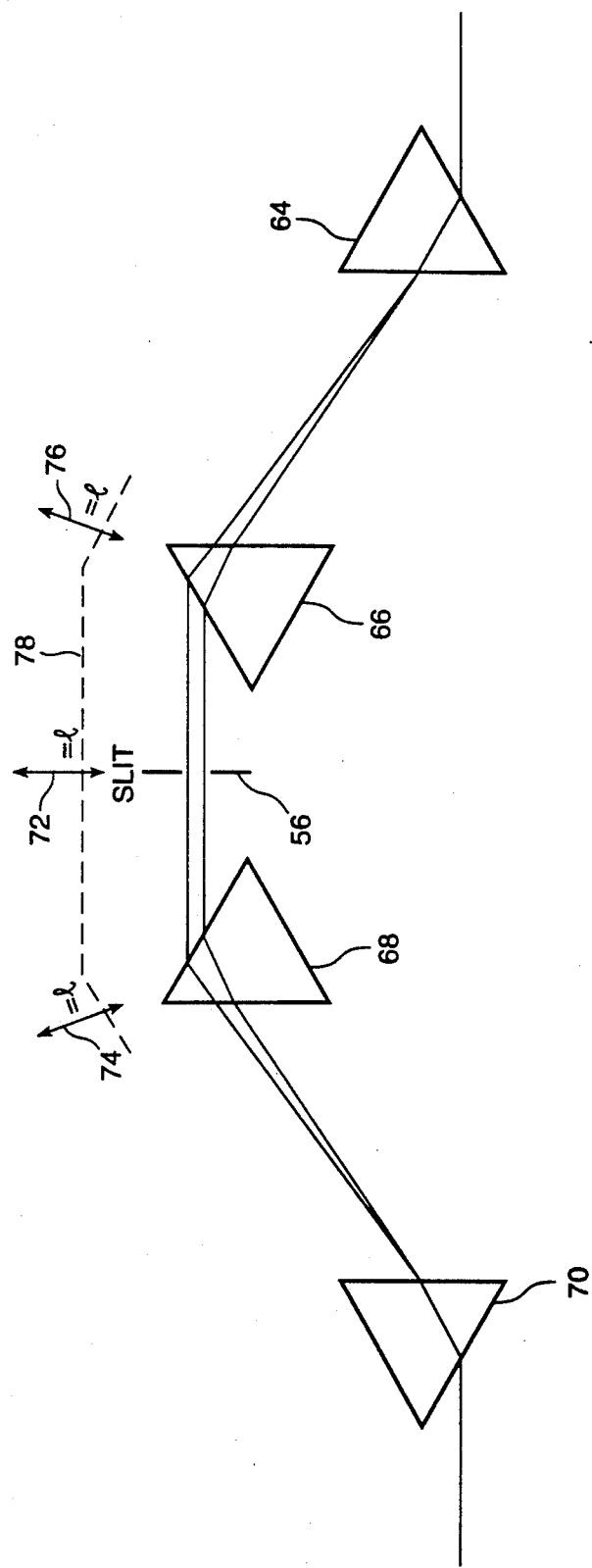
FIG. 4b is a diagram of the portion of the linear laser cavity of FIG. 4a comprising its prism arrangement portion illustrating a presently preferred tuning and compensation mechanism.

A preferred embodiment of the present invention allows the large prism spacings required for Ti:Sapphire lasers, efficient mode matching, ease of alignment and tuning of a linear cavity. Such an embodiment is shown in FIGS. 4a and 4b. Referring first to FIG. 4a, a laser 10 in a folded cavity looks much like the laser of FIGS. 3a–3c, except that a group of four prisms 64, 66, 68, and 70 are positioned in the arm of the cavity containing mode locker 24 and a curved end mirror 20. The curved end mirror 20 can be a G0058 substrate available from Spectra-Physics Optics Corporation and have a curvature of 157 cm. Curved mirror 20 can be the output coupler since the spectral spread of the laser beam generated in the first two prisms 64 and 66 is cancelled in the second two prisms 68 and 70.

To tune the laser of FIG. 4a, a birefringant filter 26 may be used in the same manner as in the embodiment of FIG. 3a. Using the birefringent filter, 75 femtosecond pulses have been generated.

Alternately, a slit 56 can be placed between the second and third prisms 66 and 68, where the wavelengths are spread spatially, as illustrated in FIG. 4b. Pulses of 40 femtoseconds duration have been observed when using such a slit. The laser may be tuned by translating the slit in a direction perpendicular the beam path as indicated by the double-headed arrow 72. As the slit 56 is translated by a distance 1, however the beam will pass through the second and third prisms 66 and 68 at a different point. As may be seen from FIG. 4b, as the laser is tuned to longer wavelengths, the beam will move towards the base of the prisms and traverse a longer path through the glass prism material, thus altering the dispersion compensation in the cavity. The compensation and tuning mechanisms can be made to act together by simultaneously translating the second and third prisms by the same distance 1 along an axis perpendicular to their bases and bisecting their apex angles as indicated by double headed arrows 74 and 76 in FIG. 4b. It has been discovered that to simultaneously tune and compensate the laser through a substantial bandwidth at a fixed pulse width (optimum dispersion compensation), the two prisms and slit should translate the same direction and at a rate such that the beam traverses the prism at a fixed distance from its tip. For the equilateral SF-10 prisms pictured in FIG. 4b, the prism will be translated at a rate of 1.15 times faster than the slit (cos 30°)$^{-1}$. As will be apparent to those of ordinary skill in the art from the above disclosure, these translations may be mechanically coupled by any one of a number of known mechanical coupling means, symbolically illustrated by dashed line 78 passing through double headed arrows 72, 74, and 76.

It has been further discovered that including a sequence of prisms and a GTI in the same cavity can be advantageous, if a GTI with a spacing of eighty microns is used by itself, pulses of 1-2 picoseconds are produced. If this GTI is combined with prisms the same pulses are observed. In this regime the GTI dominates. Thus a laser can be easily converted from a picosecond laser (using prisms) to a femtosecond laser just by adding the GTI to the laser cavity of FIG. 4a. While the prisms compensate the intracavity dispersion (linear group velocity dispersion) they introduce some errors at the same time. These are in the form of higher order terms in the group velocity dispersion equation. These errors can limit the shortest pulsewidth obtainable and can be corrected by using a GTI, with a spacing of about four to ten microns and a reflectivity between 4% and 25%.

Active mode locking at pulse widths under 10 psec is difficult since the laser becomes very sensitive to matching the round trip time of a pulse in the laser cavity to the period of the amplitude modulation used to mode-lock the laser. Closed loop mode locking is used in a preferred embodiment of the present invention to reduce sensitivity to cavity fluctuations.

Figure 5:
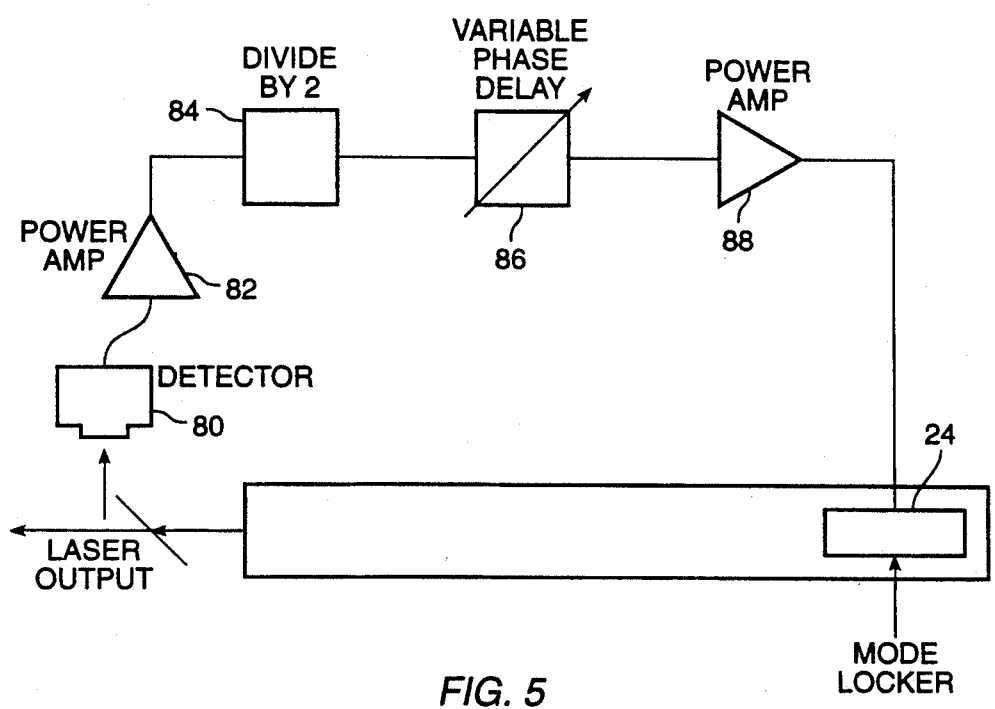
FIG. 5 is a schematic block diagram of a closed loop electronic circuit used to initiate mode locking in the laser of FIG. 1 in a presently preferred embodiment of the invention.

As shown in FIG. 5, the presently preferred technique for stabilizing the dispersion compensated laser of the present invention is to detect the beat frequency between adjacent longitudinal modes. A photodetector, preferably a high speed photodiode 80, detects the beat frequency between adjacent longitudinal modes. The signal from photodiode 80 is amplified in amplifier 82, which may be a model 603L available from ENI in Rochester N.Y. The frequency of the signal is halved in divide by two circuit 84, which may be a 10016 divide by N integrated circuit available from Fairchild of Mountainview CA, or equivalent. The signal is passed through an electronically adjustable phase shifter 86, which may be a model PEW 360 available from Merrimac, Inc. of West Caldwell, N.J. or equivalent. The signal is then amplified by power amplifier 88. The phase shifter is adjusted to provide the optimal time delay for the modulation signal applied to the mode locker 24. The phase is adjusted to provide short, stable pulses from the oscillator. This signal is applied to the acousto-optic modelocker 24.

If the cavity length drifts the beat frequency between the longitudinal modes changes, the rf signal applied to the modulator changes in exactly the right manner to track the drift in cavity length. Thus the modelocker 24 is automatically synched to the round trip of the laser cavity.

This closed loop technique provides distinct advantages over the usual technique of driving the mode-locker directly with an external RF source. First, the stability of the laser is greatly improved by having the mode-locker automatically synched to the cavity. If an external RF source is used and the cavity round trip time, which depends on the cavity length, becomes mismatched, the laser will exhibit fluctuations in amplitude approaching 100%. In addition the pulse width will also fluctuate. The mismatch which can be tolerated is a function of the pulse width but is on the order of a 5 micron cavity length change per a 1.8 meter cavity and a 5 picosecond pulse. With the mode-locker synched to the cavity, the cavity length can be varied several millimeters with no substantial change in the pulse amplitudes or pulse width.

Secondly, since the mismatch that can be tolerated between the mode-locker drive frequency and the cavity round trip time becomes smaller as the pulse becomes shorter, the stability of the cavity puts a lower limit on the pulse width that can be generated. The inventors have found that stable 5 picosecond pulses can be generated using an external RF source to drive the mode-locker but that 2 picosecond pulses will not be stable due to small changes in the cavity length. When the closed loop electronics from FIG. 5 are used and the mode-locker automatically tracks the cavity length changes. pulses as short as 1.1 picosecond have been generated with no loss of stability.

As will be appreciated by those of ordinary skill in the art, one consequence of the use of this technique which may be a disadvantage in some applications is that the laser is not stable with respect to any external reference clock. If long term stability is desired, the longitudinal mode beat frequency can be phase locked to a stable external clock using standard phaselocking techniques. The phase locking method would use a piezoelectric crystal, or other suitable length transducer, to adjust the laser mirror separations so as to phase lock the cavity round trip time to an external reference.

In other laser systems known to the inventors, the synthesizer is tied to the mode locker and the cavity is allowed to drift in length. The actively mode locked laser system described herein uses a different clock than is used in presently known systems. In the present system the cavity is tied to the mode locker and is then phase locked to a synthesizer. The advantages of the present scheme include the ability to obtain shorter pulses and improved stability as a result of tying the mode locker, cavity and synthesizer together in this manner.

Figure 6:
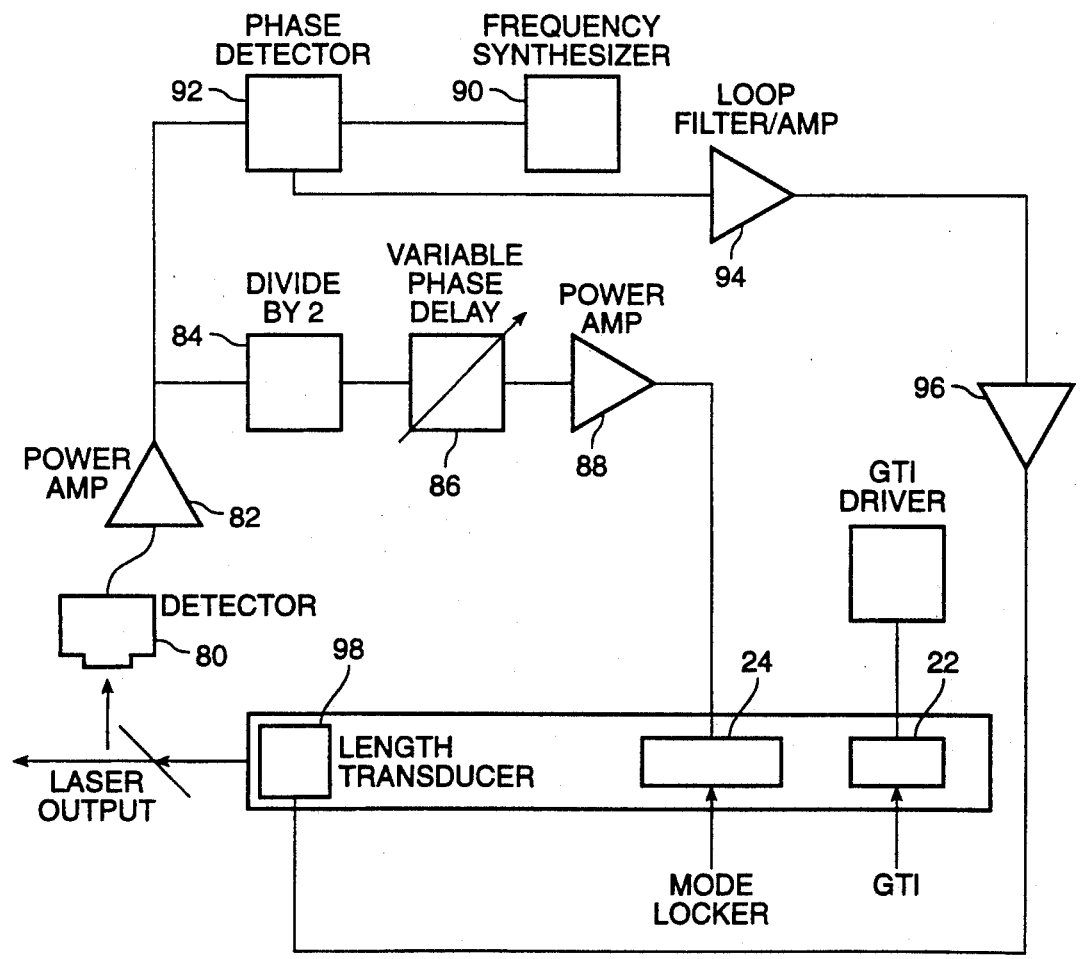
FIG. 6 is a schematic block diagram of a closed loop phase locked electronic circuit used to initiate mode locking and stabilize the laser of FIG. 1 in a presently preferred embodiment of the invention.

Referring now to FIG. 6, a block diagram of the dispersion compensated laser of the present invention is shown with a phase locked, closed loop control system. As can be seen from FIG. 6, the stabilizing circuitry used in FIG. 5 is present. In addition, the amplified signal from detector 80 and amplifier 82, and a reference clock signal from reference clock 90 are compared with each other in phase detector 92. Reference clock 90 may be any clock circuit capable of producing a clock signal, preferably a sine wave, at the frequency of interest. Phase detector 92 may be a circuit such as that shown in the schematic diagram in Appendix A hereto.

The output of phase detector 92 is amplified in loop filter/amplifier 94, which may be a circuit such as that shown in the schematic diagram in Appendix B hereto. The output of loop filter amplifier 94 drives a high voltage driver 96, which may be a Spectra physics 476 interferometer driver whose output is used to drive length transducer 98, which may be a model P-178.10, manufactured by Physik Instrumente, of Waldbronn, West Germany available from Poly Tec Optronics, Costa Mesa, California.

As an example of an embodiment of the present invention, a Ti:Sapphire laser system having a 80 micron air space GTI with a 4% reflector and a 100% reflector, a one plate birefringent filter, and a 15% output coupler was pumped wi&h an all lines argon ion laser at 8 watts pump power. The mode locker is driven by the closed loop circuit disclosed in FIG. 5. The observed output at 780 nanometers was 1.5 watts at a pulse width of 1.3 picoseconds at a repetition rate of 82 MHz.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A laser system for producing nearly transform-limited pulses, said pulses having a duration less than about 100 picoseconds, including:
   a laser gain medium;
   means for exciting said gain medium;
   means for defining a laser cavity;
   means for mode locking said laser system;
   means for tuning said laser; and
   a GTI etalon located in said cavity, said GTI etalon comprising a highly reflective surface and a partially reflective surface, said highly reflective surface and said partially reflective surface having a spacing of between about 200–1,500 microns.

2. A laser system for producing nearly transform-limited pulses, said pulses having a duration less than about 10 picoseconds, including:
   a laser gain medium having a thickness greater than about 1 mm;
   means for exciting said gain medium;
   means for defining a linear laser cavity, said means including one curved end mirror;
   means, located in said cavity, for initiating and sustaining mode locking of said laser system;
   means for tuning said laser; and
   first and second prism pairs aligned in said cavity so as to produce temporal dispersion of a laser beam in said cavity with substantially no spatial dispersion of said laser beam.

3. The laser of claim 2 wherein said means for initiating and sustaining mode locking is active.

4. The laser system of claim 2 wherein said means for tuning comprises a slit disposed in said cavity in said beam path at a position between said two prism pairs, and further including slit-translating means for translating said slit along a translation axis perpendicular to said beam path.

5. The laser system of claim 4, further including prism-translating means for translating the two of said prisms in said first and second prism pairs located closest to said slit along a translation axis perpendicular to their bases and bisecting their apex angles, said prism-translating means and said slit-translating means coupled so as to simultaneously translate said prisms and said slit along their respective translation axes a distance such that the beam always transverses the prisms at substantially the same distance from the tip.

6. The laser system of claim 5, further including a GTI etalon located in said cavity, said GTI etalon comprising a highly reflective surface and a partially reflective surface, said highly reflective surface and said partially reflective surface having a spacing of between about 4 to 1,500 microns.

7. A laser system for producing nearly transform-limited pulses, said pulses having a duration less than about 100 picoseconds, including:
   a Ti:Sapphire laser gain medium;
   means for exciting said gain medium;
   means for defining a laser cavity;
   means for mode locking said laser system;
   means for tuning said laser; and
   a GTI etalon located in said cavity, said GTI etalon comprising a highly reflective surface and a partially reflective surface, said highly reflective surface and said partially reflective surface having a spacing of between about 200–1,500 microns.

8. A laser system for producing nearly transform-limited pulses, said pulses having a duration less than about 10 picoseconds, including:
   a Ti:Sapphire laser gain medium;
   means for exciting said gain medium;
   means for defining a linear laser cavity, said means including one curved end mirror;
   means, located in said cavity, for initiating and sustaining mode locking of said laser system;
   means for tuning said laser; and
   first and second prism pairs aligned in said cavity so as to produce temporal dispersion of a laser beam in said cavity with substantially no spatial dispersion of said laser beam.

9. The laser of claim 8 wherein said means for initiating and sustaining mode locking is active.

10. The laser system of claim 8 wherein said means for tuning comprises a slit disposed in said cavity in said beam path at a position between said two prism pairs, and further including slit-translating means for translating said slit along a translation axis perpendicular to said beam path.

11. The laser system of claim 10, further including prism-translating means for translating the two of said prisms in said first and second prism pairs located closest to said slit along a translation axis perpendicular to their bases and bisecting their apex angles, said prism-translating means and said slit-translating means coupled so as to simultaneously translate said prisms and said slit along their respective translation axes a distance such that the beam always traverses the prisms at substantially the same distance from the tip.

12. The laser system of claim 11, further including a GTI etalon located in said cavity, said GTI etalon comprising a highly reflective surface and a partially reflective surface, said highly reflective surface and said partially reflective surface having a spacing of between about 4 to 1,500 microns.

* * * * *